April 29, 1930. B. REYNOLDS 1,756,212
SAFETY ATTACHMENT FOR VEHICLE WHEELS
Filed July 10, 1928 2 Sheets-Sheet 1

Inventor
Boyd Reynolds

By Clarence A O'Brien
Attorney

April 29, 1930.     B. REYNOLDS     1,756,212
SAFETY ATTACHMENT FOR VEHICLE WHEELS
Filed July 10, 1928    2 Sheets-Sheet 2

Inventor

Boyd Reynolds

By Clarence A. O'Brien
Attorney

Patented Apr. 29, 1930

1,756,212

UNITED STATES PATENT OFFICE

BOYD REYNOLDS, OF McKEESPORT, PENNSYLVANIA

SAFETY ATTACHMENT FOR VEHICLE WHEELS

Application filed July 10, 1928. Serial No. 291,590.

The present invention relates to improvements in attachments for vehicle wheels and has reference more particularly to a device for preventing lateral skidding of the wheels of an automobile, while travelling over a slippery surface.

One of the salient objects of the present invention is to provide a safety attachment for vehicle wheels which includes a normally retracted traction increasing means carried by the vehicle wheel, means being mounted on the wheel and operable by the operator, for projecting the traction increasing means to an operative position for engagement with the ground without the necessity of the operator having to leave his seat.

Still a further object is to provide a safety attachment for vehicle wheels that can be readily and easily installed without necessitating any alterations of the parts with which the invention is associated, the anti-skid means being at all times positive and efficient in its operation.

Still a further object is to provide a safety attachment for vehicle wheels which is simple in construction, inexpensive, strong and durable and further well adapted to the purpose for which it is designed.

Other objects of the invention will become apparent as the description of the invention proceeds and when taken in connection with the accompanying drawings.

In the accompanying drawings, forming a part of this application and in which like reference characters designate like parts throughout the several views.

Figure 1:
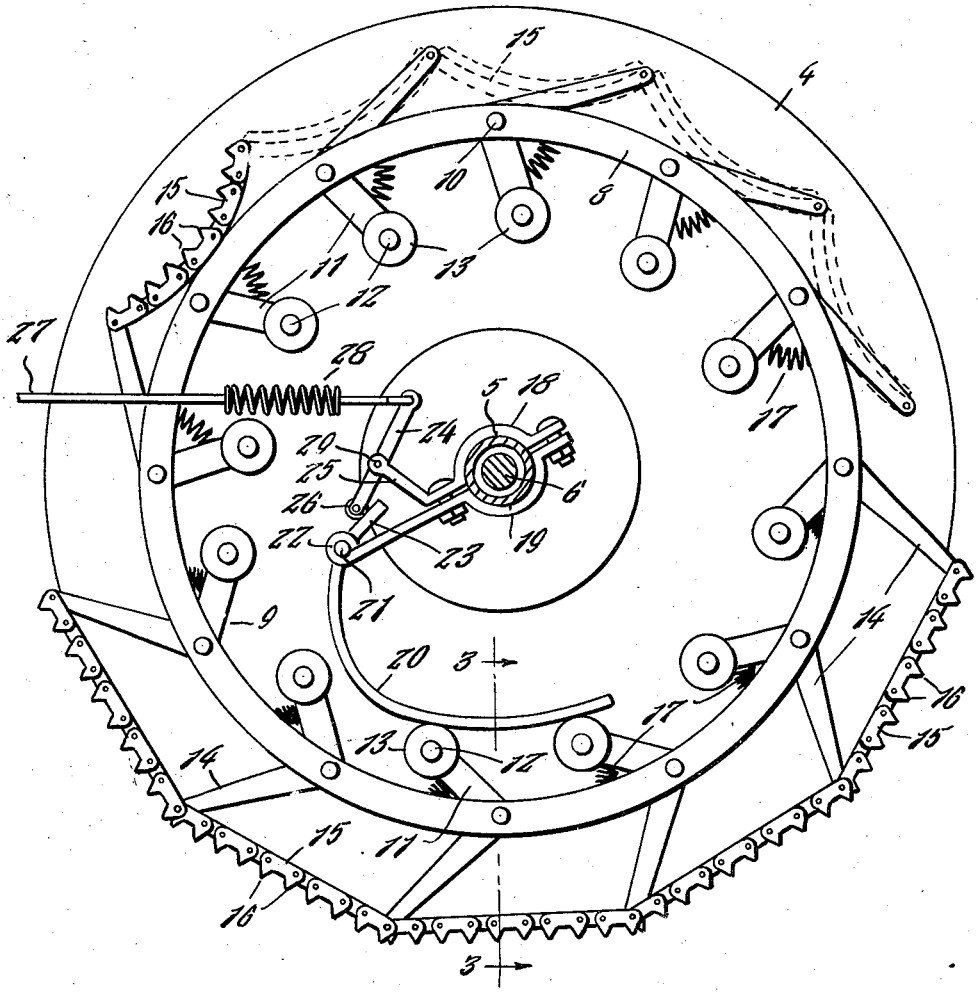
Figure 1 is an elevational view of a vehicle wheel showing my improved safety attachment mounted thereon, certain of the parts being shown in an operative position.

In the drawings, wherein for the purpose of illustration is shown the preferred embodiment of my invention, the numeral 1 designates generally a vehicle wheel that includes a felly 2, on which is mounted the usual rim 3 for supporting the ordinary pneumatic tire 4. The axle housing is shown at 5, while the axle is designated at 6. While I have shown the attachment as being associated with only one wheel, it is to be understood, of course, that all of the wheels of an automobile are to be equipped with my safety attachment, and as each attachment is identical with the one shown and about to be described, a further illustration of the attachment on all of the wheels is not believed necessary in the present case.

Figure 3:
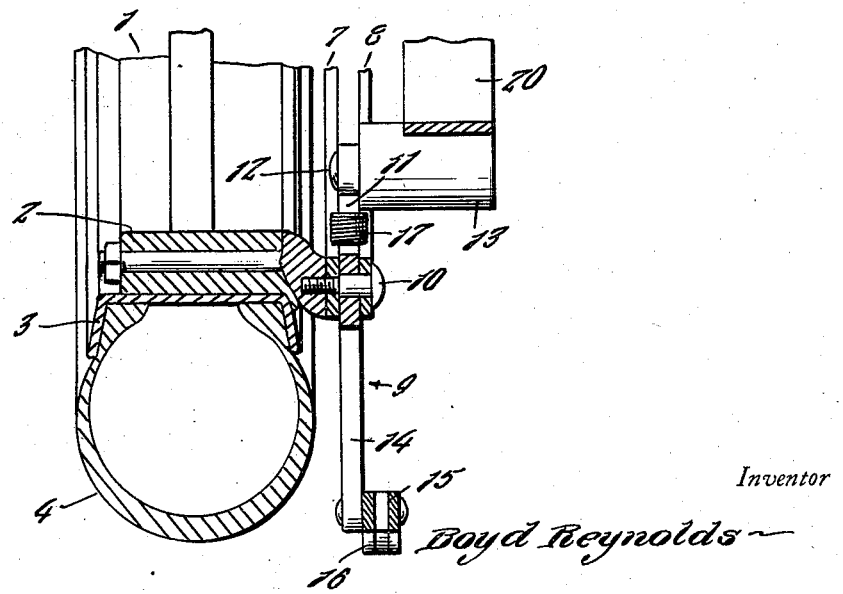
Figure 3 is a vertical sectional view, taken approximately on the line 3—3 of Figure 1.

Secured on the inner side face of the felly 2 are the spaced annular rings 7 and 8 respectively, and pivotally mounted between the spaced rings at equi-distant points are the bell crank levers denoted generally by the numeral 9, the pivotal connection for each bell crank lever being shown at 10, in Figures 1 and 3 of the drawings.

The shorter arms 11 of the bell crank levers extend inwardly beyond the inner peripheral edges of the spaced rings 7 and 8, and a laterally disposed pin 12 is carried by the inner end of each of the shorter arms 11, and a roller 13 is supported on each laterally disposed pin for free rotation thereon. Suitable ball bearings may be provided for each of the rollers.

The longer arms 14 of the bell crank levers 9 extend beyond the outer peripheral edges of the spaced rings 7 and 8, and sectional chain units 15 connect the outer ends of the longer arms of the adjacent bell crank levers. These chains have certain of their links formed with ground engaging teeth 16 to provide traction increasing lugs and normally the outer ends of the longer arms and the chain sections 15 are disposed within the confines of the ground engaging portion of the pneumatic tire, as shown very clearly in the upper portion of Figure 1, and appropriate normally expanded coil springs 17 are associated with the shorter arms of the bell crank levers and the spaced rings for holding the bell crank levers in this particular position.

The upper end of the curved shoe 20 is provided with a laterally projecting pintle 21 that is disposed within an eye 22, formed on one end of the section 19, of the clamping unit that is secured around the axle housing 5 and this pintle is located inwardly of the upper end of the curved shoe as clearly shown in Figure 1, whereby said upper end of the shoe provides a tripping foot 23, for a purpose to be presently described.

A lever 24 is pivotally secured intermediate its ends on the angular extension 25 and associated with the complementary section 18 of the bracket that is clamped around the axle housing, and carried by the lower end of the vertically disposed lever 24 is a roller 26 that has engagement with the foot 23 of the shoe 20.

A sectional operating rod 27 is connected at its rear end to the upper end of the pivoted lever 24, while the forward end extends to a point within easy reach of the operator of the vehicle. A shock absorbing spring 28 is associated with the rear portion of the operator's rod to let the pressure off in case an obstruction is engaged by the wheels when travelling over a road bed.

Figure 2:
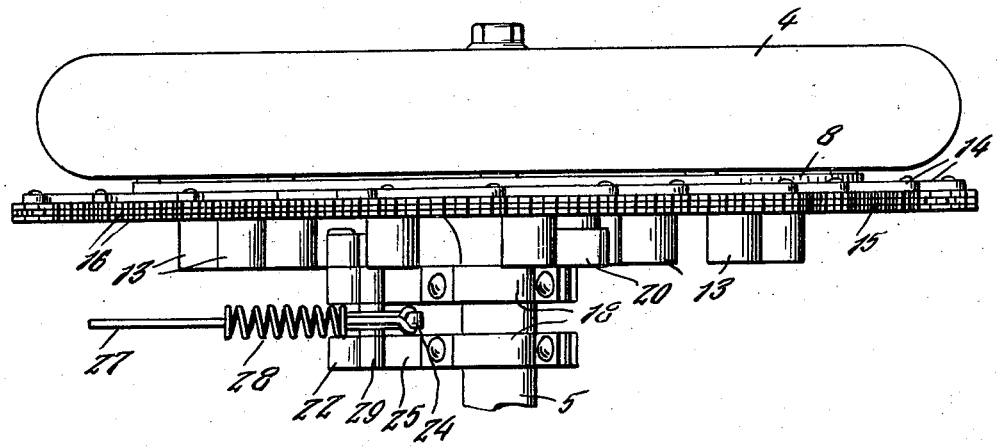
Figure 2 is a top plan view.

As clearly shown in Figure 2, the sectional clamping unit includes two pairs of complementary sections that are slightly spaced with respect to each other and the rod 29 that supports the lever 24 is arranged between the outer ends of the angularly disposed portions 25 associated with the spaced upper sections 18.

As heretofore explained, the shoe 20 is normally disposed out of the path of the roller 13, so that the wheels may travel over the ground without the anti-skid chains coming into contact with the surface. However, when the road is wet or the vehicle is travelling over a muddy surface, the operator actuates the rod 27 whereby to swing the lever 24 in such a manner as to cause the roller 26 to force the foot 23 rearwardly and downwardly and this will result in the pivoted shoe 20 being moved outwardly, so that as the wheel rotates, the rollers 13 will successively engage the outer face of the shoe and this will result in the bell crank levers being actuated to effect the outward movement of the arms 14, so that the anti-skid chain sections of these particular bell crank sections will be brought into engagement with the ground and thus prevent lateral skidding of the wheels and insure a positive traction. As soon as the rod 27 is released, the parts will again assume their normal position so that the anti-skid device will be disposed in an inoperative position and cannot engage wth the road surface.

It will thus be seen from the foregoing description that I have provided a safety attachment for vehicle wheels that can be readily and easily mounted on each of the wheels without necessitating any material alterations, and due to its simplicity, the attachment will, at all times, be positive and efficient in its operation. Also the movement of the ground engaging chains into engagement with the ground can be controlled by the operator, at will, without having to leave his seat.

While I have shown the preferred embodiment of my invention, it is to be understood that various changes in the size, shape and arrangement of parts may be resorted to, without departing from the spirit of the invention or the scope of the appended claims.

I claim:

1. A safety attachment for a vehicle wheel comprising a plurality of ground engaging elements mounted on the wheel, means for normally holding the elements out of ground engaging position, a bracket fixed to the axle of the wheel having spaced angular extensions, a pivoted lever carried by one extension, a pivotally mounted shoe carried by the other extension, said lever having one end overlapping the adjacent end of the said shoe whereby pivotal movement of the lever will cause the outer end of the shoe to be moved into engagement with underlying ground engaging elements for placing the latter in ground engaging positions, an operating rod connected to said lever, and a shock absorber associated with said rod.

2. A safety attachment for vehicle wheels comprising a plurality of ground engaging elements mounted on the wheel, means for normally holding the elements out of ground engaging position, a bracket fixed to the axle of the wheel having spaced angular extensions, a pivoted lever carried by one extension, a pivoted shoe carried by the other extension, said lever having one end overlapping the adjacent end of said shoe whereby pivotal movement of the lever will cause the outer end of the shoe to be moved into engagement with underlying ground engaging elements for placing the latter in ground engaging position, and an operating rod connected to said lever.

In testimony whereof I affix my signature.

BOYD REYNOLDS.